US012783323B2

(12) United States Patent
Shpilyuck et al.

(10) Patent No.: US 12,783,323 B2
(45) Date of Patent: Nov. 3, 2026

(54) MANAGING USE OF RESOURCES IN DISTRIBUTED SYSTEMS

(71) Applicant: Dell Products L.P., Round Rock, TX (US)

(72) Inventors: Boris Shpilyuck, Ashdod (IL); Maxim Balin, Gan-Yavne (IL); Igor Dubrovsky, Beer Sheva (IL); Nisan Haimov, Beer Sheva (IL)

(73) Assignee: Dell Products L.P., Round Rock, TX (US)

(*) Notice: Subject to any disclaimer, the term of this patent is extended or adjusted under 35 U.S.C. 154(b) by 462 days.

(21) Appl. No.: 18/491,173

(22) Filed: Oct. 20, 2023

(65) Prior Publication Data

US 2025/0130869 A1 Apr. 24, 2025

(51) Int. Cl.
*G06F 9/50* (2006.01)
*H04L 67/10* (2022.01)

(52) U.S. Cl.
CPC .......... *G06F 9/5083* (2013.01); *G06F 9/5072* (2013.01); *H04L 67/10* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 10,999,766 | B2 * | 5/2021 | He | H04L 47/822 |
| 2023/0409410 | A1 * | 12/2023 | Kairali | G06F 9/5072 |

* cited by examiner

*Primary Examiner* — Eric C Wai
(74) *Attorney, Agent, or Firm* — WOMBLE BOND DICKINSON (US) LLP

(57) ABSTRACT

Methods and systems for managing distributed systems are disclosed. The distributed system may be managed by monitoring for overloaded data processing systems of the distributed system. If identified, workloads from the overloaded data processing systems may be migrated to other data processing systems that are not overloaded to improve the likelihood of timely generating results from the workloads. The results may be used in distributed processes that may require the results to be timely. If the results are not timely obtained, the distributed processes may be impacted.

20 Claims, 5 Drawing Sheets

MANAGING USE OF RESOURCES IN DISTRIBUTED SYSTEMS

FIELD

Embodiments disclosed herein relate generally to resource management. More particularly, embodiments disclosed herein relate to systems and methods to manage allocation of resources.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
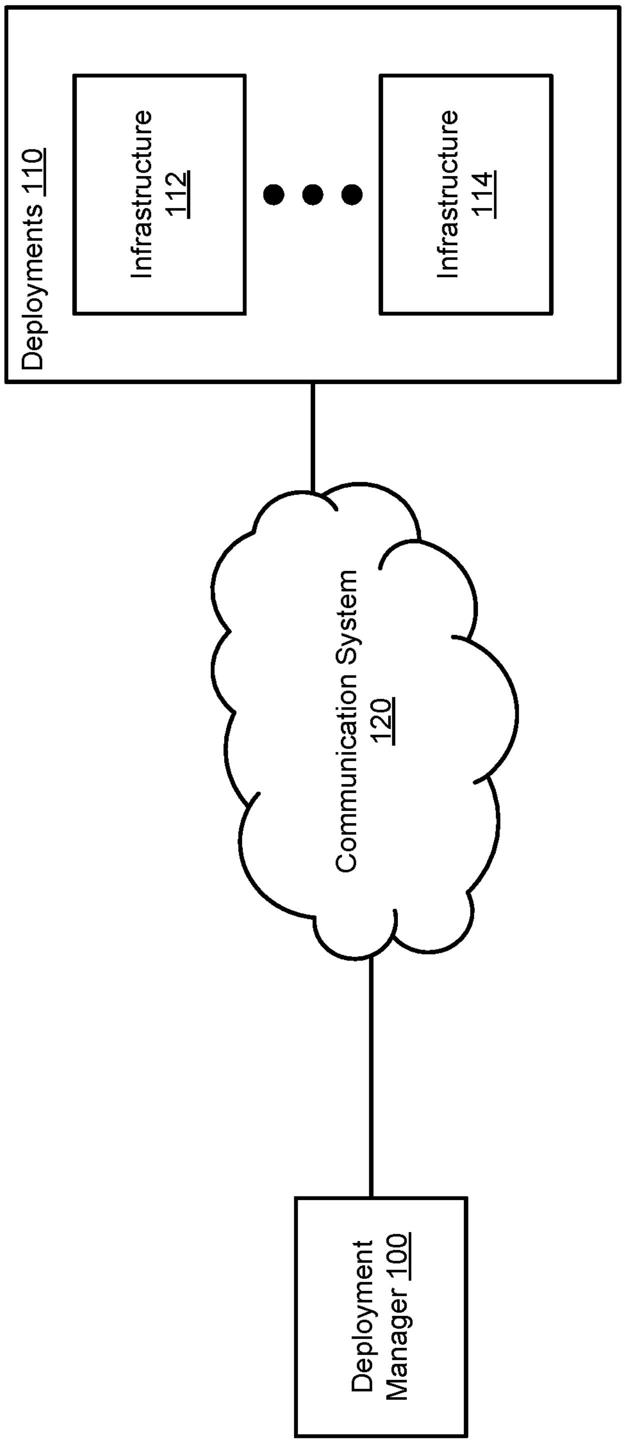
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing resource allocations in distributed systems. To provide computer implemented services, a distributed system may assign different resources (e.g., data processing systems) to take on different roles. Different roles may contribute to goals of the distributed system in different manners.

To align the allocation of resources to different roles, the system may automatically monitor the operation of the resources assigned to the roles to identify whether any of the resources are overloaded. If a resource is overloaded, the system may attempt to automatically migrate some workloads from the overloaded resource to other resources that are not overloaded. The results from the workloads may be returned to the overloaded resource so that the resource may be more likely to have results available timely so that the results may be used in distributed process such as processing pipelines.

By doing so, embodiments disclosed herein may improve the likelihood of desired computer implemented services being provided timely. Consequently, phantom slowdowns and/or other undesired impacts of processing results that are late may be less likely to be encountered. The resulting system, from the perspective of the user, may be more appealing by, for example, appearing to be more responsive.

In an embodiment, a method for managing resources of a distributed system is provided. The method may include monitoring operation of a first data processing system of the distributed system to identify an occurrence of an overload event, the overload event indicating that the first data processing system is likely to fail to timely generate a result required for timely completion of a data flow performed the first data processing system and at least one other component of the distributed system; analyzing the distributed system to attempt to identify a second data processing system that is not overloaded; in an instance of the analyzing where the second data processing system is successfully identified as not being overloaded: identifying a workload hosted by the first data processing system; offloading the workload to the second data processing system to obtain a workload result; and providing by the result to the first data processing system to facilitate the timely completion of the data flow.

The first data processing system may be an edge device that is a member of edge infrastructure of the distributed system.

The second data processing system may be a member of data processing center infrastructure of the distributed system, the edge infrastructure being remote to the processing center infrastructure.

The processing center infrastructure may include a data center (e.g., high density computing environment that includes infrastructure to support, for example, computer racks) in which the second data processing system is located.

Monitoring operation of the first data processing system may include identifying a processing resources utilization level for the first data processing system; identifying a memory resources utilization level for the first data processing system; and comparing at least one of the processing resources utilization level for the first data processing system and the memory resources utilization level for the first data processing system to criteria that discriminate overloaded data processing systems to determine whether the first data processing system is overloaded.

The processing resources utilization level may include an average use level of processors of the first data processing system for a period of time. The memory resources utilization level comprises an average use level of memory of the first data processing system for a period of time. While describe with respect to two types of resources, it will be appreciated that other types of computing resources (e.g., storage, communication bandwidth, availability of special purpose hardware devices such as graphics processing units) may be taken into consideration. Additionally, the utilizations levels for each resource may be multidimensional and take into account, for example, throughput, bandwidth, latency, power consumption, heat generation, and/or other characteristics of different computing resources.

Analyzing the distributed system to attempt to identify the second data processing system that is not overloaded may include identifying a processing resources utilization level for the second data processing system; identifying a memory resources utilization level for the second data processing system; and comparing at least one of the processing resources utilization level for the second data processing system and the memory resources utilization level for the second data processing system to second criteria that discriminate not overloaded data processing systems to determine whether the second data processing system is not overloaded.

The criteria may include a first threshold associated with processing resources utilization levels and the second criteria may include a second threshold associated with processing resources utilization levels.

The first threshold may be higher than the second threshold, and the second threshold may be a maximum threshold while the first threshold may be a minimum threshold. It will be appreciated that other types of criteria may be used (e.g., acceptable ranges) without departing from embodiments disclosed herein.

In an embodiment, a non-transitory computer readable media (e.g., a machine readable medium) is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system of FIG. 1 may include deployments 110. A deployment may include collections of various infrastructure 112, 114. Infrastructure (e.g., 112-114) may include any number of data processing systems (e.g., servers, edge devices, internet of things devices, data centers, etc.) that may provide all or a portion of the computer implemented services (e.g., cooperatively and/or independently). Different infrastructure and deployments may provide similar or different computer implemented services.

To provide the computer implemented services, the components of infrastructure of deployment 110 may take on various roles that contribute in different matters to the computer implemented services. For example, the roles may include data collection roles, data management roles (e.g., sending/aggregating data), data processing roles, and/or other types of roles.

To implement a role, components of the infrastructure may be assigned to perform the role. When so assigned, the components may configure their operation for the role. Thus, once assigned, the computing resources of the component may be dedicated to the role. It will be appreciated that components may take on multiple roles, thereby dividing the computing resources (e.g., processing, storage, memory, communication, and/or other types of computing resources) of the component across different roles.

However, while assigning components to different roles may facilitate resource allocation, the resulting allocation of resource for the role may be misaligned, insufficient, and/or otherwise undesirable. If the resource allocations are undesirable, then resources of the system may be squandered on functionalities performed by components assigned to the roles that do not (and/or ineffectively) contribute to the goals of the system.

For example, if a goal of a system is to provide a particular type of services that uses a certain type of data, roles that facilitate collections of other types of data may be important for the service to be provided. However, misallocations of resources in this manner such that insufficient resources are allocated for collections purposes, then the overall services provided by the system may be impacted, impaired, and/or may be undesirable for other reasons.

In general, embodiments disclosed herein may provide methods, systems, and/or devices for managing allocation of resources in a distributed system. The resources may be dynamically allocated in a manner that aligns the resource allocations with goals of a system. By doing so, the efficiency of resource use in a system for achieving system goals may be improved and/or may cause the system to be more likely to be able to meet desirable goals.

To allocate the resources, the system may granularly track the resource consumption level of each of the data processing systems that contribute toward a service. If the consumption level of the resources meets certain criteria, then the system may automatically attempt to reallocate resources for the function performed by the data processing systems that are likely to lack sufficient resources to provide their functionalities.

For example, the availability of resources of each data processing system may be compared to thresholds to categorize the data processing systems as being overloaded (e.g., too much work to perform for given resources) or underloaded (e.g., excess resources for performing the work assigned to it) (e.g., a load status). Based on the load status of each data processing system, the workloads of overloaded data processing systems may be at least in part migrated to other data processing systems for performance. The results of the migrated workloads may be returned to the original data processing systems and used by the data processing systems to perform cooperative workloads such as data flows that span multiple data processing systems (e.g., to establish a processing pipeline).

By doing so, the allocation of resources for system level goals may be better aligned through dynamic and proactive identification of load states and reallocation of workloads based on the load states to align resources of the distributed system with corresponding workloads.

To provide the above noted functionality, the system of FIG. 1 may include deployment manager 100, deployments 110, and communication system 120. Each of these components is discussed below.

Deployment manager 100 may manage allocation of resources of deployments 110. To manage allocation of resources, deployment manager 100 may (i) track resource consumption levels of data processing systems to identify over and underloaded data processing systems, (ii) migrate workloads from overloaded to underloaded data processing systems, and/or (iii) manage distribution of workload results to data processing systems assigned to perform the workloads prior to migration to allow data flows and corresponding data processing pipelines (e.g., multiple data processing systems that may contribute to and/or participate in a distributed process).

Deployments 110 may include any number of collections of infrastructure 112-114. The infrastructure may provide various computer implemented services. Different infrastructure may include different types and/or numbers of data processing systems that may perform different roles.

To facilitate resource allocation, deployments 110 may (i) granularly track the load state of member data processing systems, and (ii) cooperate with deployment manager 100 to migrate workloads and distribute results of the workloads to facilitate data flows and operation of processing pipelines. The components of deployments 110 may host automation framework that facilitate data collection, migration of workloads, and distribution of workload results. To implement that automation framework, various repositories of information usable to implement the workloads may be distributed across deployments 110 (e.g., may be local or remote to any of the components).

While illustrated as being separate from deployments 110, the functionality of deployment manager 100 may be performed by any of the components of deployments 110. For example, deployment manager 100 may be implemented using a distributed management framework. The management framework may perform the functionality of deployment manager 100, discussed herein.

Figure 2A:
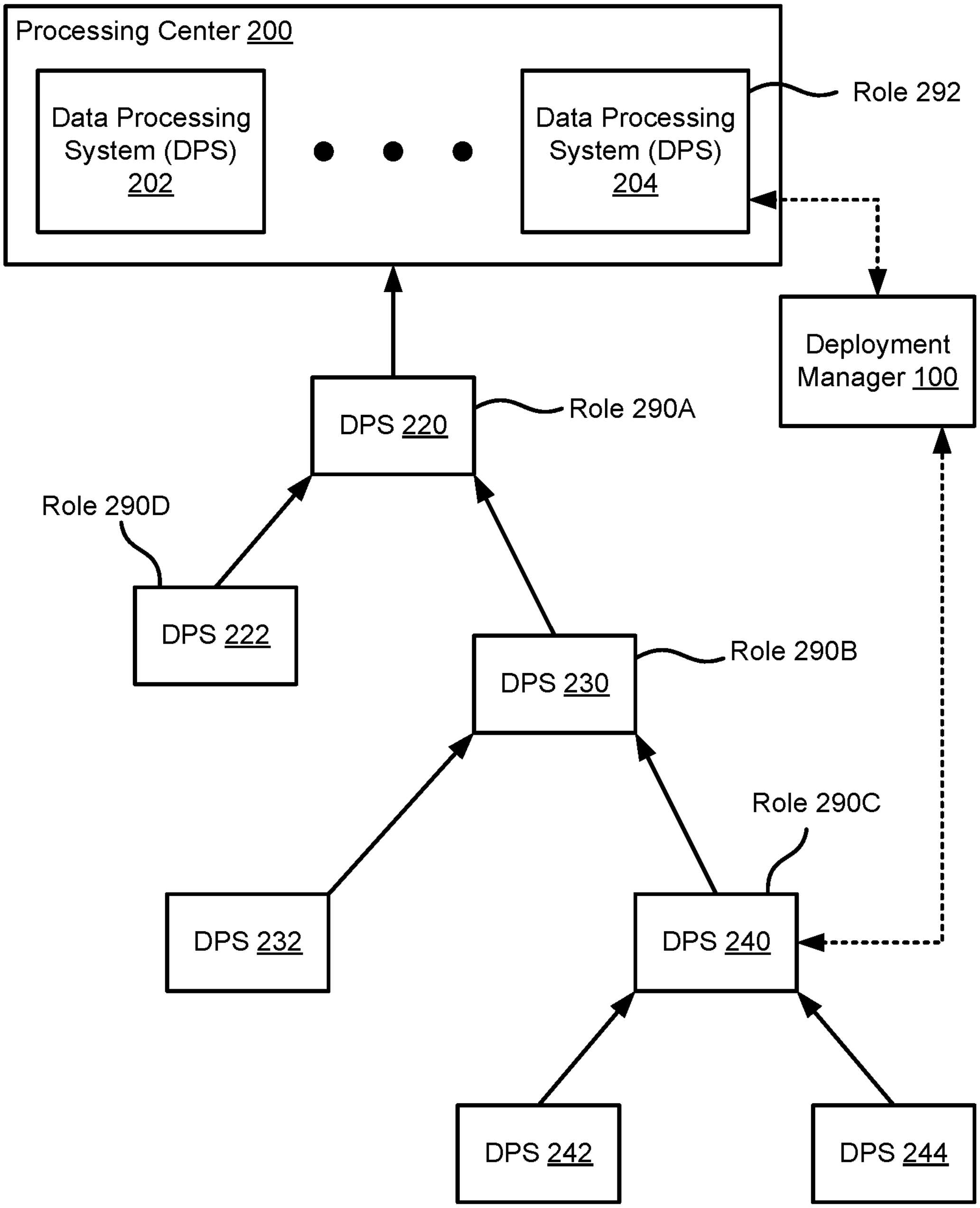
FIG. 2A shows a block diagram illustrating a pipeline in accordance with an embodiment.
Figure 2B:
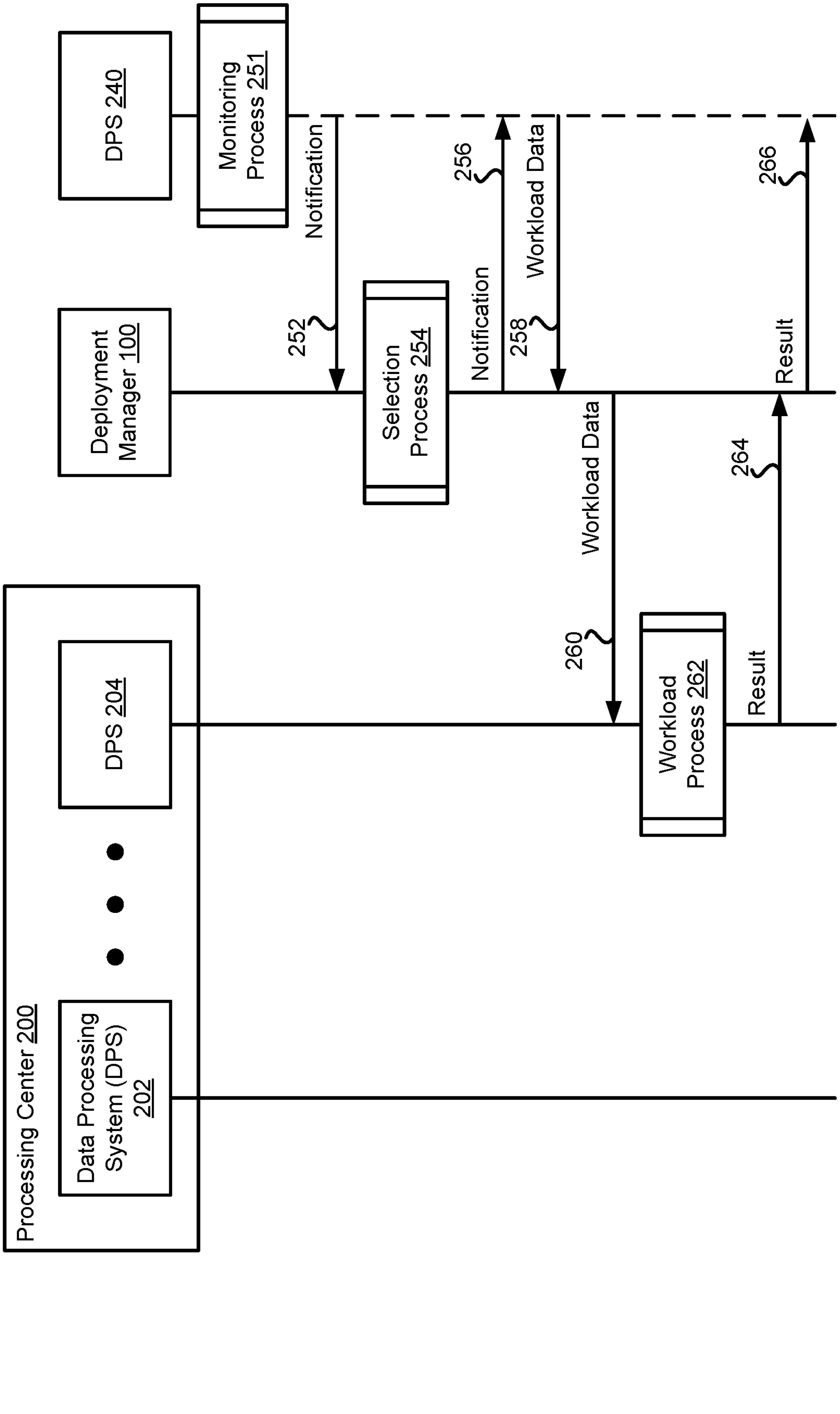
FIG. 2B shows an interaction diagram in accordance with an embodiment.
Figure 3:
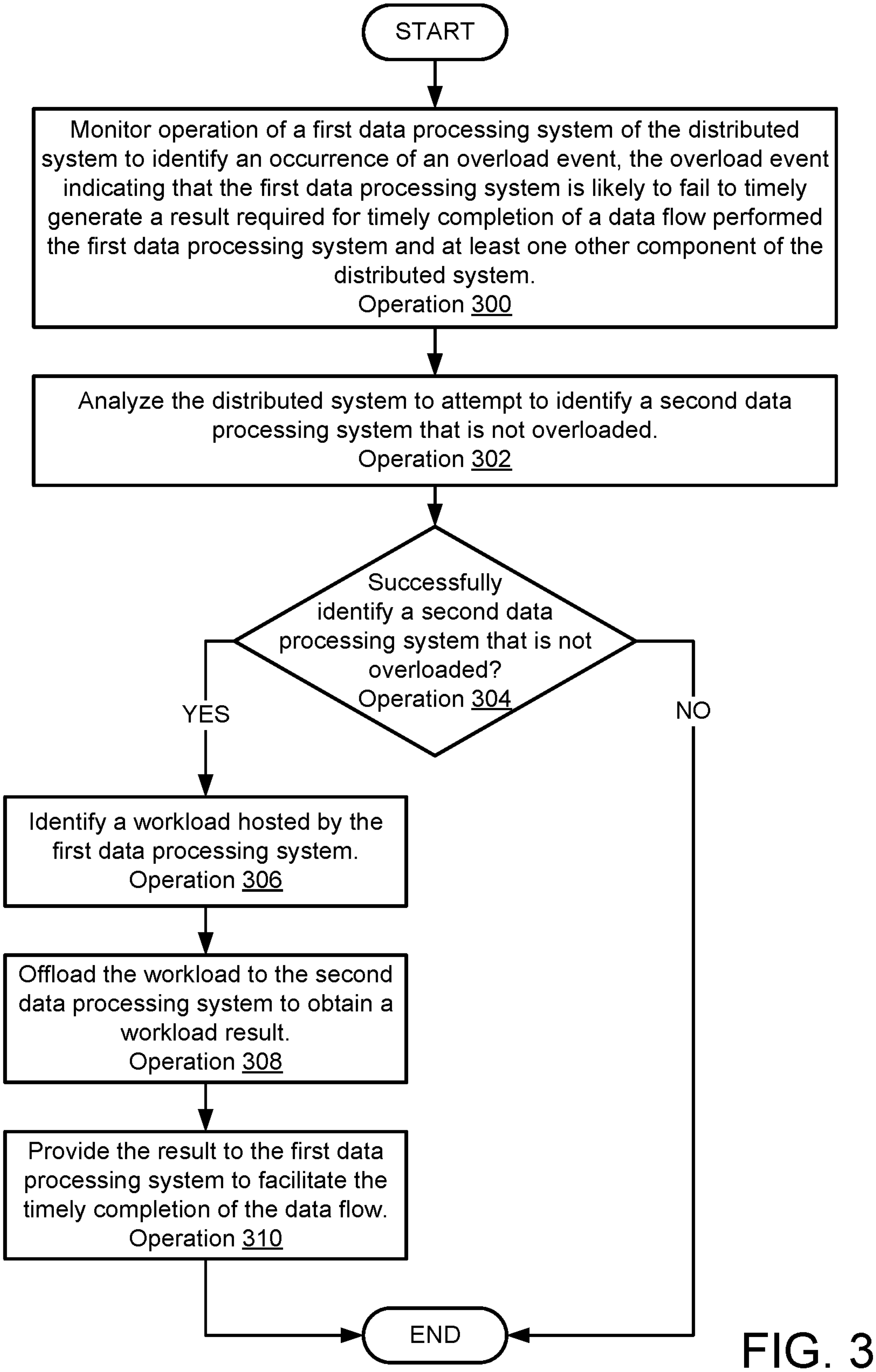
FIG. 3 shows a flow diagram illustrating a method in accordance with an embodiment.

When providing their functionality, any of deployment manager 100 and deployments 110 may perform all, or a portion, of the interactions, processes, and methods illustrated in FIGS. 2B-3.

Any of deployment manager 100 and deployments 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those illustrated therein.

As discussed above, deployments of the system of FIG. 1 may include any number of data processing systems (DPSs) and/or other types of components that my take on different roles. The roles may be assigned, for example, to establish a data collection and processing system (e.g., a processing pipeline). For example, data processing systems able to collect data may be assigned data collection roles. Other data processing systems downstream from the collection roles may take on data management roles to aggregate and direct data further downstream. Still other data processing systems positioned in high density compute environments or other types of environments may take on processing roles using the data supplied by the collection and management roles upstream of the processing roles. These roles may establish a processing pipeline architecture.

Turning to FIG. 2A, a diagram of an example processing pipeline architecture in accordance with an embodiment is shown. In FIG. 2A, DPSs (e.g., 202-244) may be allocated for performance of different roles (e.g., 290A-290D). In the figure, solid lines terminating in arrows between the DPSs assigned to each role indicate flows of data in the processing pipeline architecture.

For example, in FIG. 2A, some DPSs (e.g., 222, 232, 242, 244) may take on data collection roles (e.g., 290D) because they are located proximately to data sources (not shown). In contrast, other DPSs (e.g., 202, 204, 220, 230, 240) may take on data management roles (e.g., 290A, 290B, 290C) due to being able to transmit data downstream or data processing roles (e.g., 292) by virtue of being located in processing center 200 and having access to significant resources to facilitate processing workloads.

However, the DPS assigned to each role may, from time to time, lack sufficient resources to keep up with the workloads placed on it for a corresponding role. In such scenarios, the inability to keep up with the workload may impact the higher level operation of the processing pipeline. For example, the management roles may be dependent on the data collections roles for performance. If the data collection role devices lack sufficient resources (e.g. thereby becoming a bottleneck), then the processing pipeline may be impacted. For example, the management role devices may have sufficient resources to perform their functions but these functions may be dependent on the results of the workloads performed by the data collection role devices.

To reduce the likelihood of being impacted and/or reduce the severity of impacts, each of the DPSs may track their own resource consumptions levels and self-report to deployment manager 100 their resource consumption levels and/or load state (e.g., based on the resource consumption levels).

If a DPS reports that it is in an overloaded state, then deployment manager 100 may attempt to migrate a workload from it to another DPS and return a processing result. Consequently, the workload on the DPS may be reduced while still allowing a processing result to be obtained thereby allowing the DPS to provide the processing result as part of its membership in the processing pipeline. Accordingly, the DPS may not and/or may to a reduced extent bottleneck the processing pipeline.

In this manner, edge infrastructure (e.g., 220-244) and data center infrastructure (e.g., 200) may cooperatively share the load for operation of a processing pipeline.

To further clarify embodiments disclosed herein, an interaction diagrams in accordance with an embodiment is shown in FIG. 2B. The interaction diagrams may illustrate how data may be obtained and used within the system of FIG. 1-2A.

In the interaction diagram, processes performed by and interactions between components of a system in accordance with an embodiment are shown. In the diagram, components of the system are illustrated using a first set of shapes (e.g., 200, 250, etc.), located towards the top of each figure. Lines descend from these shapes. Processes performed by the components of the system are illustrated using a second set of shapes (e.g., 250, 254, etc.) superimposed over these lines. Interactions (e.g., communication, data transmissions, etc.) between the components of the system are illustrated using a third set of shapes (e.g., 252, 256, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 252 may occur prior to the interaction labeled as 256. However, it will be appreciated that the processes and interactions may be performed in different orders, any may be omitted, and other processes or interactions may be performed without departing from embodiments disclosed herein.

Now, consider an example scenario where DPS 240 (e.g., part of edge infrastructure) is tasked with collecting data. To ensure that its duties as part of a processing pipeline that includes processing center 200 do not impact operation of the processing pipeline, monitoring process 251 may be performed. During monitoring process 251, DPS 240 may monitor aspects of its operation and compare its operation to criteria. The comparison to the criteria may indicate whether DPS 240 is overloaded or underloaded.

For example, the criteria may include one or more thresholds. The thresholds may be compared to corresponding aspects (and/or aggregate aspects) of the monitored operation of DPS 240. The thresholds may include an overload threshold and an underloaded threshold. The overload threshold may indicate a resource consumption level (e.g., 80%, 90%, etc. of total resources) that if exceeded indicates that the DPS 240 is in an overloaded state. The underloaded threshold may also include a threshold but that if not exceeded indicates that DPS 240 is in an underloaded state. For example, the overload threshold may be 90% and the underload threshold may be 70%. If the resource consumption level of DPS 240 is 95% of total resources, then DPS 240 may be overloaded. If the resource consumption level of DPS 240 is 65% of total resources, then DPS 240 may be underloaded. If the resource consumption level of DPS 240 is 80% of total resources, then DPS 240 may not be overloaded or underloaded.

Based on the identified load state, at operation 252, DPS 240 may send notification to deployment manager 100. The notification may indicate the load state and/or information on which the load state determination is made (e.g., aspects of operation of DPS 240).

For the purposes of this example, consider DPS 240 as having notified deployment manager 100 that it is overloaded. If not overloaded, then the notification may be used by deployment manager 100 to identify whether DPS 240 is a candidate device to which to migrate workloads of other overloaded devices.

However, when the notification indicates that DPS 240 is overloaded, selection process 254 may be performed. During selection process 254, deployment manager 100 may identify another DPS to which to migrate workload. Deployment manager 100 may do so based on notifications from other devices similar to that provided in operation 252 and/or various criteria (e.g., distance between devices, history of operation, and/or other factors that may indicate that a DPS is a good candidate for workload migration in that it will reduce impact on the distributed for the migration when compared to other DPSs that are also underloaded).

Deployment manager 100 may select an underloaded DPS. For the purposes of this example, consider DPS 204 as having notified deployment manager 100 that it was underloaded and having been selected during selection process 254.

Once selected, at operation 256, a notification may be provided to DPS 240. The notification may indicate that DPS 204 has been selected for migration of a workload. The notification may also specify the workload, or may allow a framework hosted by DPS 240 to select a workload for migration.

Based on the notification, DPS 240 may, at operation 258, send workload data to deployment manager 100 which may, at operation 260, forward the workload data to DPS 204 for processing. Once obtained, DPS 204 may use the workload data to perform workload process 262. Workload process 262 may be any type of workload corresponding to the workload data and performance of workload process 262 may generate a result. The result may be any type and quantity of data.

Once obtained, at operation 264, the result may be sent to deployment manager 100 which may in turn, at operation 266, forward the result to DPS 240.

Once obtained by DPS 240, the result may be used by DPS 240 to perform a cooperative process, participate in a data flow, and/or operate as part of a processing pipeline. For example, DPS 240 may forward the result to another DPS in the pipeline (e.g., DPS 202) and/or may use the result to perform other calculations through which additional data may be obtained and forwarded along the processing pipeline.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, processes and interactions shown in FIG. 2B, infrastructure may dynamically reallocate resources at least temporarily to relieve bottlenecks that may otherwise impact processing pipelines and/or other types of cooperative operation of data processing systems of infrastructure.

As discussed above, the components of FIG. 1 may perform various methods to manage operation of infrastructure dynamic resource allocation to address processing bottlenecks. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing resource allocation in accordance with an embodiment is shown. The method may be performed by any of deployment manager 100, deployments 110, and/or other components of the system shown in FIG. 1.

At operation 300, operation of a first data processing system of a distributed system is monitored to identify an occurrence of an overload event. The overload event may indicate that the first data processing system is likely to fail to timely generate a result required for timely completion of a data flow performed by the first data processing system and at least one other component of the distributed system. The occurrence may be identified by (i) monitoring aspects of the operation of the first data processing system based on criteria that discriminates overloaded from underloaded data processing systems, and (ii) comparing the monitored aspects (e.g., resource consumption levels) of the operation to the criteria to identify the load state of the first data processing system. The overload event may be when the first data processing system enters the overloaded state of operation.

The criteria may include any number of thresholds corresponding to, for example, different types of computing resources. If the use levels of any of the computing resources exceeds the thresholds, then the load state may be overloaded.

The criteria may include an aggregate threshold corresponding to, for example, combinations of the level of use of the different types of computing resources. The combination may be based on a weighted some or other combination method to allow an administrator to weight and/or otherwise ascribe different levels of importance to different types of computing resources when considering load states of data processing systems.

At operation 302, the distributed system is analyzed to attempt to identify a second data processing system that is not overloaded. The attempt may be similarly to operation 300, but may use a different threshold that, if not exceeded, indicates that a data processing system is not overloaded. The other data processing systems of the distributed system may be sequentially and/or in parallel analyzed to identify whether any are not overloaded, and/or the analysis may be performed ahead of time with results stored in a lookup data structure which may return a list of data processing systems that are not overloaded (e.g., if any are available).

In addition to reviewing activity of the second data processing system, an estimated level of overhead (e.g., time, computing resources) for migrating workloads from the first data processing system to the second data processing system may be considered. For example, another data processing system may not be considered to be overloaded unless it has (i) excess available resources to perform the workload, and (ii) the time benefit for migrating the workload weighed against the resource cost for performing the migration indicates that a net benefit for the system will be obtained by performing the migration. The estimate may be used with an inference model (e.g., trained machine learning model that predicts resource cost/time for migration), a set of rules, and/or other type of algorithm for estimate overhead.

At operation 304, a determination is made regarding whether a second data processing system was successfully identified. If one was successfully identified, then the method may proceed to operation 306. Otherwise, the method may end following operation 304.

At operation 306, a workload hosted by the first data processing system is identified. At least one workload may be identified. The workload may be identified, for example, by selecting a workload with a processing result most at risk of not being available timely (e.g., various criteria may indicate timeliness of available workloads.

At operation 308, the workload is offloaded to the second data processing system to obtain a workload processing result. The workload may be offloaded by transmitting workload data from the first data processing system to the second data processing system. An automation framework on the second data processing system may automatically perform the workload using the workload data.

The workload data may include any type and quantity of data, and the workload may be any type of workload.

Multiple workloads may be offloaded until the first data processing system is not in the overloaded state.

At operation 310, the workload result is provided to the first data processing system to facilitate timely completion of the data flow. The workload result may be transmitted to the first data processing system from the second data processing system.

Once obtained, the workload result may be used by the first data processing system to continue to participate in the data flow, and/or as a member of a processing pipeline.

The method may end following operation 310.

Thus, using the method shown in FIG. 3, embodiments disclosed herein may facilitate dynamic allocation of resources to various portions of a distributed process being performed. By dynamically allocating the resources, the distributed process may be less likely to be impaired due to failure for timely generation of results necessary for the distributed process to be performed.

For example, if a data processing system is tasked with performing inferences using a trained machine learning model and data obtained from another data processing system to be processed via inferencing is obtained at a rate that exceeds the inferencing rate, downstream users of the inference in a processing pipeline may be held up while the inferences are not generated in a timely manner.

Processing may be performed timely, for example, if the processing does not limit the operation of other portions of a distributed system (e.g., or at least does not limit it to the extent that the system is designed to not limit the other portions of the distributed system). Thus, timely may be defined in terms of a schedule if the system operates using a schedule, in terms of time other data processing systems spend waiting for processing results produced by the data processing system, etc.

Figure 4:
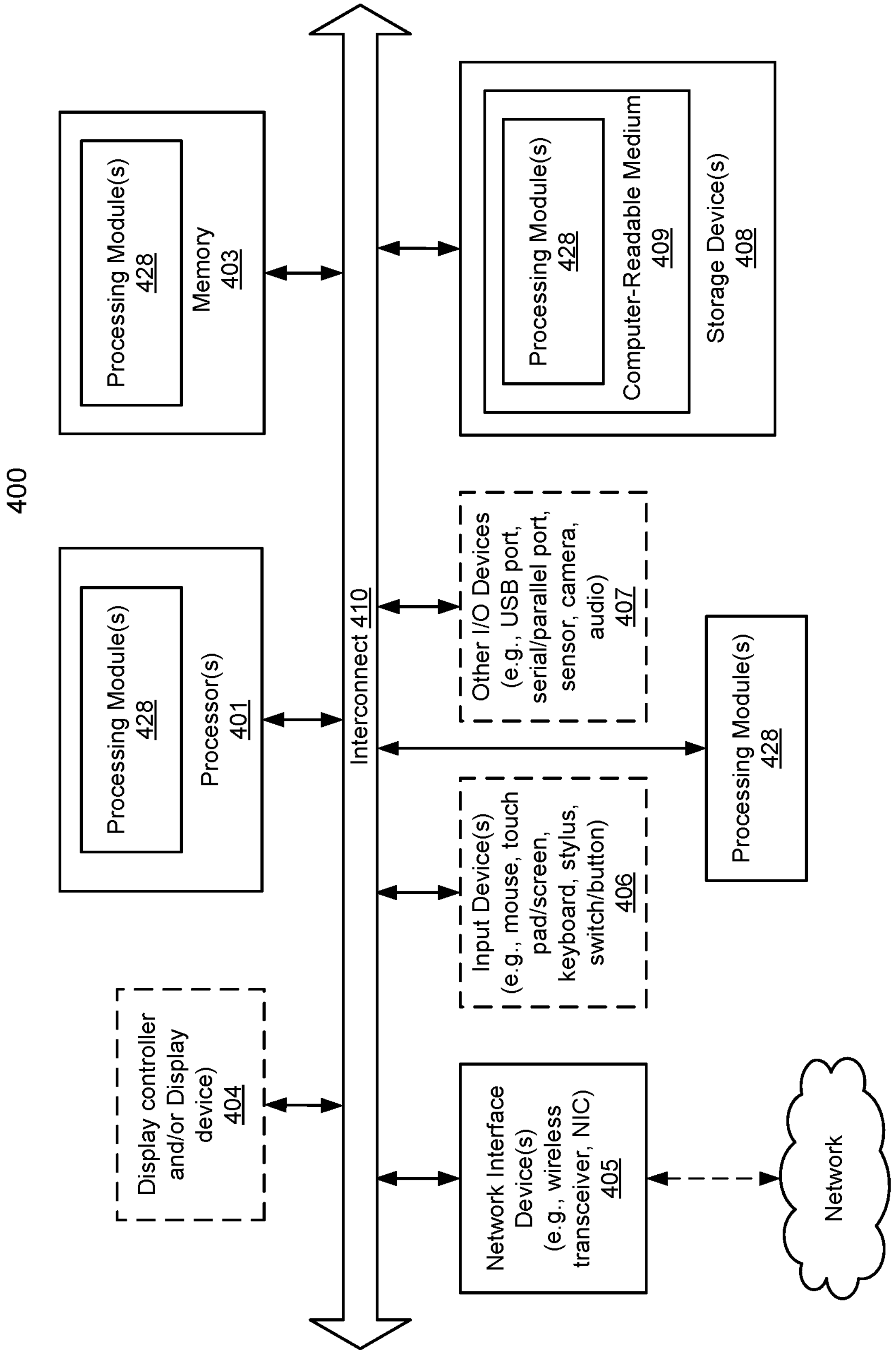
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing resources of a distributed system, the method comprising:

monitoring operation of a first data processing system of the distributed system to identify an occurrence of an overload event, wherein the first data processing system is an edge device of edge infrastructure of the distributed system, the edge infrastructure being remote to a data processing center infrastructure of the distributed system, wherein a processing pipeline of the distributed system comprises a data flow from the first data processing system to an intermediate data processing system of the edge infrastructure to a central data processing system of the data processing center infrastructure, wherein the overload event indicates that the first data processing system is likely to fail to timely generate a result required for timely completion of the data flow of the processing pipeline;

analyzing the distributed system to attempt to identify, from members of the data processing center infrastructure, a second data processing system that is not overloaded, that is not the central data processing system, and that is not a member of the processing pipeline; and in an instance of the analyzing where the second data processing system is successfully identified as not being overloaded:

identifying a workload hosted by the first data processing system;

offloading the workload to the second data processing system to obtain a workload result; and providing the workload result to the first data processing system to facilitate timely completion of the data flow.

2. The method of claim 1, wherein the data processing center infrastructure comprises a data center in which the second data processing system is located.

3. The method of claim 1, wherein monitoring operation of the first data processing system comprises:

identifying a processing resources utilization level for the first data processing system;

identifying a memory resources utilization level for the first data processing system; and comparing at least one of the processing resources utilization level for the first data processing system and the memory resources utilization level for the first data processing system to criteria that discriminate overloaded data processing systems to determine whether the first data processing system is overloaded.

4. The method of claim 3, wherein the processing resources utilization level comprises an average use level of processors of the first data processing system for a period of time.

5. The method of claim 3, wherein the memory resources utilization level comprises an average use level of memory of the first data processing system for a period of time.

6. The method of claim 3, wherein analyzing the distributed system to attempt to identify the second data processing system that is not overloaded comprises:

identifying a processing resources utilization level for the second data processing system;

identifying a memory resources utilization level for the second data processing system; and comparing at least one of the processing resources utilization level for the second data processing system and the memory resources utilization level for the second data processing system to second criteria that discriminate not overloaded data processing systems to determine whether the second data processing system is not overloaded.

7. The method of claim 6, wherein the criteria comprises a first threshold associated with processing resources utilization levels and the second criteria comprises a second threshold associated with processing resources utilization levels.

8. The method of claim 7, wherein the first threshold is higher than the second threshold, and the second threshold is a maximum threshold while the first threshold is a minimum threshold.

9. The method of claim 1, wherein the workload of the first data processing system is selected based on a processing rate of the workload being less than a data collection rate of a data collection role device that is upstream of the first data processing system in the edge infrastructure.

10. The method of claim 9, wherein the processing rate is a rate of generating inferences with a trained machine learning model by the first data processing system.

11. The method of claim 1, wherein analyzing the distributed system comprises estimating a level of overhead for migration from the first data processing system to the second data processing system.

12. The method of claim 11, wherein identifying the second data processing system is based on a comparison, performed by a trained machine learning model, of the level of overhead for the migration against a time benefit for the migration of the workload.

13. The method of claim 1, wherein, during the offloading from the first data processing system to the second data processing system, the workload is not handled by the intermediate data processing system or the central data processing system of the processing pipeline.

14. The method of claim 13, wherein, during the providing of the workload result from the second data processing system to the first data processing system, the workload result is not handled by the intermediate data processing system or the central data processing system of the processing pipeline.

15. A non-transitory machine-readable medium having instructions stored therein, which when executed by a processor, cause operations for managing resources of a distributed system, the operations comprising:

monitoring operation of a first data processing system of the distributed system to identify an occurrence of an overload event, wherein the first data processing system is an edge device of edge infrastructure of the distributed system, the edge infrastructure being remote to a data processing center infrastructure of the distributed system, wherein a processing pipeline of the distributed system comprises a data flow from the first data processing system to an intermediate data processing system of the edge infrastructure to a central data processing system of the data processing center infrastructure, wherein the overload event indicates that the first data processing system is likely to fail to timely generate a result required for timely completion of the data flow performed of the processing pipeline;

analyzing the distributed system to attempt to identify, from members of the data processing center infrastructure, a second data processing system that is not overloaded, that is not the central data processing system, and that is not a member of the processing pipeline; and in an instance of the analyzing where the second data processing system is successfully identified as not being overloaded:

identifying a workload hosted by the first data processing system;

offloading the workload to the second data processing system to obtain a workload result; and providing the workload result to the first data processing system to facilitate timely completion of the data flow.

16. The non-transitory machine-readable medium of claim 15, wherein the data processing center infrastructure comprises a data center in which the second data processing system is located.

17. The non-transitory machine-readable medium of claim 15, wherein monitoring operation of the first data processing system comprises:

identifying a processing resources utilization level for the first data processing system;

identifying a memory resources utilization level for the first data processing system; and comparing at least one of the processing resources utilization level for the first data processing system and the memory resources utilization level for the first data processing system to criteria that discriminate overloaded data processing systems to determine whether the first data processing system is overloaded.

18. A management system, comprising:

a processor; and a memory coupled to the processor to store instructions, which when executed by the processor, cause operations for managing resources of a distributed system, the operations comprising:

monitoring operation of a first data processing system of the distributed system to identify an occurrence of an overload event, wherein the first data processing system is an edge device of edge infrastructure of the distributed system, the edge infrastructure being remote to a data processing center infrastructure of the distributed system, wherein a processing pipeline of the distributed system comprises a data flow from the first data processing system to an intermediate data processing system of the edge infrastructure to a central data processing system of the data processing center infrastructure, wherein the overload event indicates that the first data processing system is likely to fail to timely generate a result required for timely completion of the data flow of the processing pipeline;

analyzing the distributed system to attempt to identify, from members of the data processing center infrastructure, a second data processing system that is not overloaded, that is not the central data processing system, and that is not a member of the processing pipeline; and in an instance of the analyzing where the second data processing system is successfully identified as not being overloaded:

identifying a workload hosted by the first data processing system;

offloading the workload to the second data processing system to obtain a workload result; and providing the workload result to the first data processing system to facilitate timely completion of the data flow.

19. The management system of claim 16, wherein the data processing center infrastructure comprises a data center in which the second data processing system is located.

20. The management system of claim 18, wherein monitoring operation of the first data processing system comprises:

identifying a processing resources utilization level for the first data processing system;

identifying a memory resources utilization level for the first data processing system; and comparing at least one of the processing resources utilization level for the first data processing system and the memory resources utilization level for the first data processing system to criteria that discriminate overloaded data processing systems to determine whether the first data processing system is overloaded.

* * * * *